3,294,531
PHOTOCONDUCTIVE LAYERS FOR ELECTRO-
PHOTOGRAPHIC PURPOSES
Heinz Schlesinger, Wiesbaden, Germany, assignor, by mesne assignments, to Azoplate Corporation, Murray Hill, N.J.
No Drawing. Filed July 5, 1960, Ser. No. 40,519
Claims priority, application Germany, July 22, 1959, K 38,260
32 Claims. (Cl. 96—1)

As photoconductive layers for electrophotographic purposes inorganic substances, such as selenium and zinc oxide as well as several organic low molecular weight substances, such as anthracene, chrysene or benzidine have already been used.

Now, photoconductive layers for electrophotographic purposes have been found which consist, at least partially, of at least one product obtained by the reaction of aralkyl halides, and/or their substitution products, with each other, or of aromatic carbocyclic and/or aromatic heterocyclic hydrocarbons, and/or the substitution products thereof, with hydrocarbons containing at least two halogen atoms, in the presence of Friedel-Crafts catalysts.

Aralkyl halides, which can be reacted with each other according to the present invention, are e.g. benzyl chloride, 1-chloromethylnaphthalene, 9-chloromethylanthracene, and xylylchloride. Further, substitution products thereof can be used, especially those with the substituents described in the following paragraph.

Suitable aromatic hydrocarbons for the production of photoconductive substances are carbocyclic compounds such as benzene, naphthalene, anthracene, naphthacene, phenanthrene, diphenyl, terphenyl, indene, fluorene, fluoranthrene, acenaphthene, pyrene, perylene, and substitution products of such compounds. As substituents there can be used e.g. alkyl groups with 1–10 carbon atoms, such as methyl, ethyl, propyl, butyl, isobutyl, amyl, hexyl, octyl, isooctyl, and decyl; dialkylamino groups, such as dimethylamino, diethylamino, dipropylamino and dibutyl amino; halogens, such as fluorine, chlorine, bromine, and iodine; alkoxy groups, such as methoxy, ethoxy, propoxy, butoxy, and isobutoxy; moreover there can be used heterocyclic compounds of aromatic nature and suitable substitution products thereof, such as N-ethylcarbazole, N-methylcarbazole, diphenyleneoxide, phenanthridine, benzimidazole, xanthene, tioxanthene, coumarone, and 2,3-benzodiphenyleneoxide.

As polyhalogen compounds with at least two halogen atoms there can be used e.g. aliphatic compounds, such as methylene chloride, ethylene chloride, 1,4-dichlorobutane, 1,4-dibromobutane, 1,2,3-tribromopropane, 1-chloro-4-bromobutane, 1,10-dibromodecane, and araliphatic compounds, such as p-xylylenedichloride, 9,10-bischloromethylanthracene, as well as high molecular weight halogenated compounds, such as chlorinated polyethylene.

The catalysts used in the present invention, are those known as Friedel-Crafts catalysts, e.g. aluminum chloride, aluminum bromide, antimony pentachloride, boron trichloride, boron trifluoride, iron trichloride, tin tetrachloride, and zinc chloride. Aluminum chloride has been found to be especially favorable.

The production of the photoconductors is performed in known manner by the method of Friedel-Crafts. The reaction components are mixed, if necessary, in the presence of a solvent which is inert under the conditions of the reaction, such as tetrachloroethane, chloro-benzene or carbon disulfide, and then the catalyst is added. The catalyst can be added as a solid compound or dissolved in a solvent or, if it is gaseous, it can be passed into the reaction mixture. The reaction components are generally used in approximately equimolecular quantities. However, one of the components can be used in excess. Furthermore, mixtures of the reaction components can be used. The catalyst is added in such quantities that for each mole of halogen to be reacted, 0.5–2 moles, preferably 1–1.2 moles of the catalyst are used. In special cases, larger quantities of a catalyst can be used. After the addition of a catalyst, the reaction mixture is stirred for a few hours at temperatures ranging from about 20 to about 100° C., preferably from about 40 to about 60° C., until the evolution of gas ceases. Then, the reaction mixture is decomposed with ice and a strong acid, such as hydrochloric acid, the aqueous phase is decanted and the residue is freed from the solvent by a simple, or preferably by steam, distillation, whereupon a solid residue (in admixture with water) is generally obtained. This is purified after separation by recrystallization e.g. from benzene or gasoline, if necessary in the presence of active carbon.

The compounds obtained are mostly resin-like and can be applied, without uisng a binding material, as photoconductive layers on the support materials.

For the application of the above described highly polymeric reaction products as photoconductive layers in electrophotographic processes, they are suitably applied in solution in an organic solvent e.g. by casting, spraying coating or rollcoating the solution on a support and evaporating the solvent. The products can also be applied to the support in the form of dispersions in water or another dispersing agent. The base materials used as supports may be any that satisfy the requirement of electrophotography, e.g. metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g. by chemical treatment or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ohm$^{-1}$·cm.$^{-1}$, preferably higher than $10^{-10}$ohm$^{-1}$·cm.$^{-1}$.

The base material described above which has been provided with a thin, coherent layer of uniform thickness of the photoconductive substance according to the present invention is used for electrophotographically producing copies by uniformly charging the photoconductive layer in the absence of light by means of a corona discharge taken from a charging device maintained at about 6000 to 7000 volts.

Subsequently, the electrophotographic material is exposed to light in contact with a master, or by episcopic or diascopic projection of a master. An image corresponding to the master is thus produced on the base material. This invisible image is developed by contacting it with a developer consisting of carrier and toner; suitable carriers are fine glass balls, iron powder or fine plastic balls. The toner consists of a resin-carbon black mixture or a colored resin. The toner is customarily used in a particle size of about 1–100µ, preferably 5–30µ. The developer may also consist of a resin or pigment suspended in a non-conductive liquid in which, if desired, resins have been dissolved. In the case of the dry development, the image which has been made visible by development is fixed, e.g. by heating it with an infrared radiator to a temperature of 100–170° C., preferably 120–150° C., or by treatment with solvents, such as trichloroethylene, carbon tetrachloride, or ethyl alcohol or steam. Images are thus obtained which are rich in contrast.

If a polarity of the electrical charge is used which is opposite to the polarity of the toner contained in the developer, images corresponding to the master characterized by good contrast effect are obtained. By changing the polarity of the corona discharge, it is also possible to obtain reversal images from the same master and with the same developer. However, it is preferred also to change from a positive master to a negative master and vice versa, when changing the polarity to obtain the best results. This is an advantage over the inorganic photoconductors such as zinc oxide or selenium, which can be charged with one polarity only to give good images.

The electrophotographic images thus obtained may be transformed into printing plates. For this purpose they are wiped over with a suitable solvent, or with a preferably alkaline aqueous developer, rinsed with water and inked with greasy ink. Printing plates are thus obtained which may be clamped to an offset printing machine and used for printing.

If transparent supports are used, the electrophotographic images can also be used as masters for the production of additional copies on any type of layers. When using translucent supports for the photoconductive layers such as provided by the present invention, reflex images can also be produced.

The photoconductive layers of the present invention absorb light primarily within the ultraviolet range of the spectrum. The sensitivity of the photoconductive layers can be improved by the addition of activating materials. Such activators are organic compounds, which in molecular complexes of the donor-acceptor type ($\pi$-complexes, charge transfer complexes) can serve as electron acceptors. They are compounds of a high electron affinity and are acids according to the definition of Lewis, as mentioned e.g. in Kortum "Lehrbuch der Elektrochemie," 1948, page 300.

Substances of such nature are those containing strongly polarizing residues or groups, such as the cyano group or nitro group; halides, such as fluorine, chlorine, bromine, and iodine; the ketone group, the ester group, acid anhydride or acid groups such as carboxylic groups or the quinone configuration. Such polarizing electron attracting groups are described by L. F. and M. Fieser in "Organic Chemistry," 2nd edition, 1950, page 604, Table I. Because of their low vapor pressure, those substances are preferred which have a melting point above room temperature, viz. solid substances. Moderately colored substances, such as quinones, can be used; however, it is preferred to use colorless or only weakly colored substances. The preferred maximum of absorption of the substances is within the ultraviolet range of the spectrum i.e. below 4,500 A. Moreover, the activator substances to be used according to the present invention should be of low molecular weight, i.e. the molecular weight thereof should range between about 50 and about 5000, preferably between about 100 and about 1000, since with the low molecular weight activators, reproducible results with respect to sensitivity can be obtained. Moreover, the sensitivity is maintained constant over a long time, as contrary to the high molecular weight substances, the low molecular weight substances do not change substantially when stored.

Examples of such substances are:

| | |
|---|---|
| 2-bromo-5-nitro-benzoic acid. | o-Chloro-nitrobenzene. |
| 2-bromo-benzoic acid. | Chloro-acetophenone. |
| 2-chloro-toluene-4-sulphonic acid. | 2-chloro-cinnamic acid. |
| Chloro-maleic acid anhydride. | 2-chlor-4-nitro-1-benzoic acid. |
| 9-chloro-acridine. | 2-chloro-5-nitro-1-benzoic acid. |
| 3-chloro-6-nitro-1-aniline. | 3-chloro-6-nitro-1-benzoic acid. |
| 5-chloro-nitrobenzene-5-sulfochloride. | Phthalic acid anhydride. |
| 4-chloro-3-nitro-1-benzoic acid. | Chloro-mucoic acid. |
| 4-chloro-2-hydroxy-benzoic acid. | Bromo-mucoic acid. |
| 4-chloro-1-phenol-3-sulfonic acid. | Styrene-dibromide. |
| 2-chloro-3-nitro-1-toluene-5-sulfonic acid. | Xylene tetra-bromide. |
| 4-chloro-3-nitro-benzene-phosphonic acid. | $\beta,\beta,\beta$-Trichloro-lactonitrile. |
| Dibromo-succinic acid. | Triphenyl-chloro-methane. |
| 2,4-dichloro-benzoic acid. | Tetrachloro phthalic acid. |
| Dibromo-maleic acid anhydride. | Tetrabromo phthalic acid. |
| 9,10-dibromo anthracene. | Tetraiodo phthalic acid. |
| 1,5-dichloro-naphthalene. | Tetrachloro-phthalic acid anhydride. |
| 1,8-dichloro-naphthalene. | Tetrabromo-phthalic and anhydride. |
| 2,4-dinitro-1-chloro naphthalene. | Tetraiodo-phthalic acid anhydride. |
| 3,4-dichloro-nitrobenzene. | Tetrachloro-phthalic acid monoethylester. |
| 2,4-dichloro-benzisatin. | Tetrabromo-phthalic acid-monoethylester. |
| Hexabromo-phthalic acid anhydride. | Iodoform. |
| bz-1-cyano-benzanthrone. | Fumaric acid dinitrile. |
| Cyano-acetic acid. | Tetra-cyano-ethylene. |
| 2-cyano-cinnamic acid. | 1,3,5-tricyano-benzene. |
| 1,5-dicyano-naphthalene. | |
| 3,5-dinitro-benzoic acid. | 2,4-dinitro-1-chloro-naphthalene. |
| 3,5-dinitro-salicylic acid. | 1,4-dinitro-naphthalene. |
| 2,4-dinitro-1-benzoic acid. | 1,5-dinitro-naphthalene. |
| 2,4-dinitro-1-toluene-6-sulfonic acid. | 1,8-dinitro-naphthalene. |
| 2,6-dinitro-1-phenol-4-sulfonic acid. | 2-nitrobenzoic acid. |
| 1,3-dinitro-benzene. | 3-nitrobenzoic acid. |
| 4,4'-dinitro-diphenyl. | 4-nitro-benzoic acid. |
| 3-nitro-4-methoxy-benzoic acid. | 3-nitro-4-ethoxy-benzoic acid. |
| 2,6-dichloro-benzaldehyde. | Tetraiodo-phthalic acid monoethylester. |
| 4-nitro-1-methyl-benzoic acid. | 3-nitro-2-cresol-5-sulfonic acid. |
| 6-nitro-4-methyl-1-phenol-2-sulfonic acid. | 5-nitro-barbituric acid. |
| 2-nitro-benzene-sulphinic acid. | 4-nitro-acenaphthene. |
| 3-nitro-2-hydroxy-1-benzoic acid. | 4-nitro-benzaldehyde. |
| 2-nitro-1-phenol-4-sulfonic acid. | 4-nitro-phenol. |
| 4-nitro-1-phenol-2-sulfonic acid. | Picric acid. |
| 3-nitro-N-butyl-carbazole. | Picryl chloride. |
| 4-nitro-diphenyl. | 2,4,7-trinitro-fluorenone. |
| Tetra-nitro-fluorenone. | 1,3,5-trinitro-benzene. |
| 2,4,6-trinitro-anisol. | |
| Anthraquinone. | 1-chloro-2-methyl-anthraquinone. |
| Anthraquinone-2-carboxylic acid. | Duroquinone. |
| Anthraquinone-2-aldehyde. | 2,6-dichloro-quinone. |
| Anthraquinone-2-sulfonic acid-anilide. | 1,5-diphenoxy-anthraquinone. |
| Anthraquinone-2,7-disulfonic acid. | 2,7-dinitro-anthraquinone. |
| Anthraquinone-2,7-disulfonic acid-bis-anilide. | 1,5-dichloro-anthraquinone. |
| Anthraquinone-2-sulfonic acid-dimethylamide. | 1,4-dimethyl-anthraquinone. |
| Acenaphthene-quinone dichloride. | 1,5-dichloro-anthraquinone. |
| Benzoquinone-1,4. | 1-methyl-4-chloro-anthraquinone. |
| 1,2-benzanthraquinone. | 2-methyl-anthraquinone. |
| Bromanil. | Naphthoquinone-1,2. |
| 1-chloro-4-nitro-anthraquinone. | Naphthoquinone-1,4. |
| Chloranil. | Pentacene-quinone. |
| 1-chloro-anthraquinone. | Tetracene-7,12-quinone. |
| Acenaphthene-quinone. | 2,5-dichloro-benzoquinone. |
| Anthraquinone-2-sulfonic acid methylamide. | 2,3-dichloro-naphthoquinone-1,4. |
| Chrysene-quinone. | 1,4-tolu-quinone. |
| Thymo-quinone. | 2,5,7,10-tetrachloro-pyrene-quinone. |

The quantity of activator which is advantageously added to the photoconductors can be easily determined by simple experiments. It varies according to the substance used and usually amounts from about 0.1 to about 100 moles, preferably from about 1 to about 50 moles based on 1000 moles of photoconductive substance. Mixtures of several activator substances can also be used. Dyestuff sensitizers may also be added.

By the addition of the activating substances, photoconductive layers can be produced which are highly light-sensitive, especially within the ultraviolet range; they are practically colorless. By means of these substances, it is also possible to strongly activate the photoconductive layers within the ultraviolet range, whereupon a high sensitivity of the photoconductive layers within the range of visible light can be obtained by a very small addition of optical sensitizers, without sufficient of the dyestuff sensitizers being added as to result in highly colored layers.

The sensitivity of the layers may, however, be extended into the longer wave range of the spectrum by means of strongly complex-forming activators, which cause an intensification of the colors which is similar to that obtained by the use of dyestuff sensitizers.

Very small quantities of the dyestuff sensitizers capable of extending the sensitivity of the layers from the ultraviolet range into the visible range of the spectrum may be added. Additions of less than 0.01 percent of the dyestuff sensitizers are effective. In general, however, quantities of from 0.01 to 5 percent, preferably 0.05 to 3 percent, of the dyestuff sensitizers are added. Additions of larger quantities are possible but no substantial increase in the sensitivity will, in general, be achieved. If the dyestuff sensitizers are used without the addition of activators, it is advisable generally to use quantities approaching the upper limits stated above. In the presence of activators, very small quantities of dyestuff sensitizers are effective.

The following materials may be listed as examples of dyestuff sensitizers which can be used with good or excellent effect. They are taken from the "Farbstofftabellen" by Schultz, 7th edition, 1931, vol. 1:

Triarylmethane dyestuffs such as Brilliant Green (No. 760, page 314), Victoria Blue B (No. 822, page 347), Methyl Violet (No. 783, page 327), Crystal Violet (No. 785, page 329), Acid Violet 6B (No. 831, page 351); xanthene dyestuffs, namely rhodamines, such as Rhodamine B (No. 864, page 365), Rhodamine 6G (No. 866, page 366), Rhodamine G Extra (No. 865, page 366), Sulphorhodamine B (No. 863, page 364) and Fast Acid Eosin G (No. 870, page 368) as also phthaleins such as Eosin S (No. 883, page 375), Eosin A (No. 881, page 374), Erythrosin (No. 886, page 376), Phloxin (No. 890, page 378), Bengal Rose (No. 889, page 378), and Fluorescein (No. 880, page 373); thiazine dyestuffs such as Methylene Blue (No. 1038, page 449); acridine dyestuffs, such as Acridine Yellow (No. 901, page 383), Acridine Orange (No. 908, page 387) and Trypaflavine (No. 906, page 386); quinoline dyestuffs such as Pinacyanol (No. 924, page 396) and Cryptocyanine (No. 927, page 397); cyanine dyestuffs, e.g. Cyanine (No. 921, page 394) and chlorophyll.

The photoconductive layers described above may be used in reproduction processes as well as in measuring techniques for recording purposes, e.g. photographic recorders. They are, however, also suitable for the production of other devices containing photoconductors, such as photoelectric cells, photoelectric resistors, and television receiver tubes.

The photoconductive layers according to the present invention may be used in admixture with other photoconductors, with pigments, such as zinc oxide or titanium dioxide, or, if desired, with resins, such as ketone resins. It is, however, one of the advantages thereof that being high molecular weight practically colorless substances, they can be applied to the supports in the form of homogeneous transparent layers, and they require no additional binding agent or other materials to be excellent photoconductive layers.

Moreover, they have the additional advantage that if paper is used as a support, the coating solution will not penetrate too deeply into the base material.

The following examples are given of the preparation of some products according to the present invention:

Example 1

In 150 parts by volume of tetrachloroethane there are dissolved 35.7 parts by weight of 9-methyl-carbazole and 35 parts by weight of p-xylylene-dichloride, while stirring, and, at room temperature, 54 parts by weight of finely pulverized anhydrous aluminum chloride are cautiously added to the solution while the temperature increases. This solution is stirred for five hours at 40° C. and then ice and hydrochloric acid are added, while stirring, whereupon the aqueous phase is decanted. The oily residue is freed from tetrachloroethane by steam distillation and the resulting firm residue is separated from water, dissolved in benzene and, after washing with water, reprecipitated with a light petroleum ether. It is separated and dried. A light yellow powder, which begins to soften at about 175° C. is obtained. The chlorine content is 2.2 percent.

Example 2

61.3 parts by weight of diphenyl are dissolved in a mixture of 136 parts by weight of methylene-chloride and 200 parts by weight of tetrachloroethane. 105.6 parts by weight of anhydrous aluminum chloride are cautiously added, while stirring; hydrogen chloride is evolved. Stirring is continued for 3 hours at 40–50° C. until the evolution of gas has ceased, whereupon ice and hydrochloric acid are added and the tetrachloroethane is removed by steam distillation. The solid residue is drawn off by suction, thoroughly washed, first with water, and then with methanol, and finally dried. It is a light brown powder which does not melt upon heating to 350° C. Chlorine content: 2.8%.

Example 3

To a solution of 30.9 parts by weight of acenaphthene in 100 parts by volume of tetrachloroethane there are added 63.5 parts by weight of 1,4-dichlorobutane. To this mixture, there are added, while stirring, 45 parts by weight of anhydrous aluminum chloride in small portions and stirring is continued for 3 hours at 40–50° C. After decomposing the solution with ice and hydrochloric acid, the tetrachloroethane is removed by steam distillation and the resin-like residue is dissolved in benzene. The benzene solution is well agitated with water and dried. After distillation of benzene, a resin is obtained which softens between 80–100° C. and contains 4.3 percent of chlorine.

Example 4

Into a solution of 56 parts by weight of dibenzofurane in a mixture consisting of 127 parts by weight of 1,4-dichlorobutane and 200 parts by volume of tetrachloroethane, there are introduced in portions and while stirring, 90 parts by weight of anhydrous aluminum chloride and stirring is continued for 3 hours at 40–50° C. Further treatment is as described above under 3. A yellow-brown powder is obtained which is easily soluble in benzene. Softening range: 100–130° C.; chlorine content: 5.5 percent.

Example 5

56.2 parts by weight of 1,2,3-tribromo-propane are added to a solution of 61.6 parts by weight of diphenyl in 150 parts by volume of chlorobenzene. 107 parts by weight of anhydrous aluminum chloride are introduced in small portions, with stirring, at room temperature. The temperature increases only slightly. After being stirred for 3 hours at 50° C., the reaction mixture is treated as before. The compound thus formed is dissolved in benzene for purification and reprecipitated with ethanol. A yellow powder, which softens at a temperature in the range of 85 to 120° C. and contains no bromine is obtained. It is easily soluble in benzene or methylene-chloride.

Example 6

While gently heating, 18.1 parts by weight of chlorinated polyethylene (chlorine content 40 percent) and 30.8 parts by weight of diphenyl are dissolved in 700 parts by volume of chlorobenzene; the chlorinated polyethylene first swells and then dissolves entirely. 54 parts by weight of anhydrous aluminum chloride are added in portions while stirring, at room temperature, and then the solution is further stirred for one hour at a temperature of 40–50° C.; mild evolution of hydrogen chloride occurs. Finally, the solution is stirred for 4 hours at a temperature of 70° C., hydrogen chloride being evolved in large quantities. After the usual treatment and steam distillation, the raw product is boiled with a mixture consisting of methylene-chloride and chloroform (1:1) and freed from insolubles by filtration. The filtrate is washed with water, dried, concentrated to half its original quantity and precipitated with petroleum ether. The compound (5) Softening range of the high molecular weight compound (6) Halogen content of the high molecular weight compound (7) The numerals added (in parentheses) to columns 2, 3 and 4 designate the parts by weight of the reaction components used in any one reaction.

| 1 | 2 | 3 | 4 | 5 | 6 |
|---|---|---|---|---|---|
| 1 | Diphenyl (61.3) | Methylene chloride (136) | AlCl$_3$ (105) | >350° C | 2.8% Cl. |
| 2 | Benzene (264) | 1,2-dichloro-ethane (50) | AlCl$_3$ (67) | Tough resin | Traces of Cl. |
| 3 | Naphthalene (128) | 1,2-dichloro-ethane (297) | AlCl$_3$ (133) | >360° C | 6.8% Cl. |
| 4 | Anthracene (89) | 1,2-dichloro-ethane (155) | AlCl$_3$ (67) | >360° C | 5.3% Cl. |
| 5 | 9-ethyl-carbazole (98) | 1,2-dichloro-ethane (135) | AlCl$_3$ (61) | >360° C | 2.8% Cl. |
| 6 | Diphenyl (30.6) | 1,2-dibromo-propane (120.5) | AlCl$_3$ (53) | Tough resin | 1.1% Br. |
| 7 | Diphenyl (30.8) | 1,3-dibromo-butane (43.2) | AlCl$_3$ (54) | do | 0.2% Br. |
| 8 | 9-methyl-carbazole (37.8) | 1,3-dibromo-butane (43.2) | AlCl$_3$ (54) | 190-200° C | 2.2% Br. |
| 9 | 2-dimethylamino-naphthalene (17.1) | 1,3-dibromo-butane (21.6) | AlCl$_3$ (27) | Tough resin | 0.6% Br. |
| 10 | Naphthalene (51.3) | 1,4-dichloro-butane (127) | AlCl$_3$ (54) | do | 0.9% Cl. |
| 11 | Diphenyl (61.3) | 1,4-dichloro-butane (203) | AlCl$_3$ (105) | 122-125° C | 3.4% Cl. |
| 12 | Terphenyl (9.2) | 1,4-dichloro-butane (31) | AlCl$_3$ (16) | 168-171° C | 3.4% Cl. |
| 13 | Diphenyleneoxide (56) | 1,4-dichloro-butane (127) | AlCl$_3$ (90) | 100-130° C | 5.5% Cl. |
| 14 | 2,3-benzo-diphenyleneoxide (24.2) | 1,4-dichloro-butane (42.5) | AlCl$_3$ (30) | 130-145° C | 6.2% Cl. |
| 15 | 9-ethyl-carbazole (38.3) | 1,4-dichloro-butane (63.5) | AlCl$_3$ (45) | 78-82° C | 3.3% Cl. |
| 16 | Fluoranthene (40.5) | 1,4-dichloro-butane (63.5) | AlCl$_3$ (45) | 78-95° C | 6.3% Cl. |
| 17 | Anthracene (71.4) | 1,4-dichloro-butane (127) | AlCl$_3$ (107) | 85-105° C | 7.1% Cl. |
| 18 | Acenaphthene (30.9) | 1,4-dichloro-butane (63.5) | AlCl$_3$ (45) | 80-100° C | 4.3% Cl. |
| 19 | Phenanthrene (35.6) | 1,4-dichloro-butane (76.2) | AlCl$_3$ (54) | 185-200° C | 0.1% Cl. |
| 20 | Diphenyl (30.6) | 1,4-dibromo-butane (172.5) | AlCl$_3$ (53) | Tough resin | 5.8% Br. |
| 21 | Diphenyl (30.4) | p-Xylylenedichloride (35) | AlCl$_3$ (54) | 155-165° C | 0.8% Cl. |
| 22 | 9-methyl-carbazole (35.7) | p-Xylylenedichloride (35) | AlCl$_3$ (54) | 175-200° C | 2.2% Cl. |
| 23 | Naphthalene (12.8) | 9,10-bis-chloromethyl-anthracene (27.5). | AlCl$_3$ (27) | >350° C | 7.3% Cl. |
| 24 | Terphenyl (23) | 1,10-dibromo-decane (30) | AlCl$_3$ (27) | Tough resin | 0.2% Br. |
| 25 | Terphenyl (11) | 1-chloro-4-bromo-butane (8.2) | AlCl$_3$ (13) | 158-170° C | 0.5% Cl.+Br.* |
| 26 | 9-methyl-carbazole (36.2) | 1,4-dichloro-butane (12.7) | AlCl$_3$ (54) | 110-120° C | 0.1% Cl. |
| 27 | 9-methyl-carbazole (36.2) | 1,4-dichloro-butane (25.4) | AlCl$_3$ (54) | 160-165° C | 0.1% Cl. |
| 28 | 9-methyl-carbazole (36.2) | 1,4-dichloro-butane (50.8) | AlCl$_3$ (54) | 245-305° C | 0.5% Cl. |
| 29 | 9-methyl-carbazole (36.2) | 1,4-dichloro-butane (76.2) | AlCl$_3$ (54) | 155-165° C | 1.9% Cl. |
| 30 | 9-methyl-carbazole (36.2) | 1,4-dichloro-butane (101.6) | AlCl$_3$ (54) | 210-220° C | 2.3% Cl. |
| 31 | 9-methyl-carbazole (36.2) | 1,4-dichloro-butane (152.4) | AlCl$_3$ (54) | 210-225° C | 2.0% Cl. |
| 32 | Naphthalene (12.8)+diphenyl (15.4) | 1,3-dibromo-butane (43.2) | AlCl$_3$ (54) | 178-190° C | 0.6% Cl. |
| 33 | 9-methyl-carbazole (29) | 1,4-dichloro-butane (10.2)+p-xylylene dichloride (14). | AlCl$_3$ (43) | 155-165° C | 0.7% Cl. |
| 34 | Diphenyl (61.6) | 1,2,3-tribromo-propane (56.2) | AlCl$_3$ (107) | 85-120° C | |
| 35 | Diphenyl (30.8) | 1,4-dichloro-butane (76.2) | AlCl$_3$ (27) | 180-250° C | 5.2% Cl. |
| 36 | Diphenyl (30.8) | 1,4-dichloro-butane (76.2) | AlCl$_3$ (13) | 140-150° C | 5.4% Cl. |
| 37 | Diphenyl (30.8) | 1,4-dichloro-butane (76.2) | FeCl$_3$ (32) | 230-260° C | 2.0% Cl. |
| 38 | 2-chloro-naphthalene (33) | 1,3-dibromo-butane (43.2) | AlCl$_3$ (54) | Resin | 25.0% Cl.+Br.* |
| 39 | Diphenyl (30.8) | 1,5-diiodine-pentane (62.8) | AlCl$_3$ (54) | 145-175° C | 7.0% I. |
| 40 | Diphenyl (15.4) | p-Xylylene-dichloride (17.5) | SnCl$_4$ (52) | 170-180° C | 0.5% Cl. |
| 41 | Diphenyl (30.8) | Chlorinated polyethylene with 40% of chlorine (18.1). | AlCl$_3$ (54) | 160-170° C | 5.0% Cl. |
| 42 | | Benzylchloride (100) | FeCl$_3$ (0.5) | 68-72° C | 1.5% Cl. |
| 43 | | Benzylchloride (200) | FeCl$_3$ (0.2) | 74-87° C | 0.2% Cl. |
| 44 | | 1-chloromethylnaphthalene (35.3) | AlCl$_3$ (27) | 110-125° C | 8.0% Cl. |
| 45 | 2-methyl-naphthalene (100) | Benzylidene chloride (60) | FeCl$_3$ (0.3) | 73-80° C | 3.1% Cl. |
| 46 | 9-ethyl-carbazole (13.3) | 1,4-dichloro-butane (26) | AlBr$_3$ (35) | 133-145° C | 1.2% Cl. |
| 47 | | Benzylbromide (200) | FeCl$_3$ (0.2) | 58-90° C | 0.5% Br. |
| 48 | 9-ethyl-carbazole (29.3) | p-Xylylen-edibromide (39.6) | AlCl$_3$ (41) | 185-200° C | 0.9% Br. |
| 49 | 9-ethyl-carbazole (11.4) | p-Xylylene-diiodide (21) | AlCl$_3$ (16) | 139-152° C | 8.3% I. |
| 50 | Diphenyl (18.1) | p-Xylylene-dibromide (31.3) | AlCl$_3$ (32) | 144-162° C | |
| 51 | 9-ethyl-carbazole (19.5) | Chlorinated caoutchouc ("Pergut S 20") (8.8). | AlCl$_3$ (27) | 235-260° C | 11.3% Cl. |

*The content of halogen was calculated as chlorine content.

forms a yellow powder, which softens at a temperature between 160–170° C. It is easily soluble in benzene, toluene, methylene chloride and chloroform. The chloride content is 5 percent.

*Example 7*

27 parts by weight of anhydrous aluminum chloride are cautiously introduced, while stirring, into a mixture consisting of 35.3 parts by weight of 1-chloromethyl-naphthalene and 200 parts by volume of chlorobenzene, in order that the temperature of the mixture does not exceed 25° C. The solution is then stirred for two hours. After decomposition with a mixture consisting of ice and hydrochloric acid, the chlorobenzene is removed by steam distillation and the residue is purified as before. A yellow powder is obtained which is easily soluble in benzene, toluene and chloroform. Softening range: 110–125° C. The product contains 8.0 percent of chlorine.

In the following table, examples of compounds are given which are produced by the above described methods. The different columns have the following meaning:
(1) Number of the compound
(2) Hydrocarbon or heterocyclic compound used as a starting material
(3) Polyhalogen compound used for the alkylation
(4) Catalyst The invention will be further illustrated by reference to the following specific examples:

*Example 8*

To produce an electrophotographic material with the compounds according to the present invention, 0.5 part by weight of the high molecular weight compound obtained by the alkylation of 35.7 parts by weight of 9-methyl-carbazole and 35 parts by weight of p-xylene-dichloride in the presence of 54 parts by weight of aluminum chloride (see 1, above) are dissolved in 10 parts by volume of benzene. This solution is coated on paper, the surface of which is pretreated against the penetration of organic solvents. After evaporation of the solvent, a firmly adhering layer remains on the paper surface.

For the production of images with the thus produced material, the coated dried layer is provided with a negative, electric charge by means of a corona discharge produced by a charging device maintained at 6000 volts and is then exposed to the light of a high pressure mercury lamp (125 w.) under a master and treated with a developer in the conventional manner. The developer consists of small glass balls and a resin-carbon black mixture very finely divided, the latter being the so-called toner. The black colored resin adheres to those areas of the layer which were not struck by light during the exposure.

An image, corresponding to the master becomes visible, which is fixed by slight heating.

The developer used above consists of 100 parts by weight of glass balls at a particle size of 350–400μ and 2.5 parts by weight of a toner of a particle size of 20–50μ. The toner is produced by melting 30 parts by weight of polystyrene, 30 parts by weight of modified maleic acid resin (e.g. "Beckacite K105") and 3 parts by weight of carbon black (e.g. "Peerless Black" Russ 552) and then grinding and sieving the melt.

*Example 9*

Paper is coated as described in Example 8 and the layer is provided with a positive charge. After exposure under a master, the image formed on the paper foil is developed by powdering with a developer as described in Example 8, glass balls coated with a resin, e.g. coumarone resin, being used as a carrier. As a coumarone resin for coating the glass balls, the commercial product "Cumaron-Harz 601/90" is preferably used. A very good image rich in contrast and corresponding to the master used is obtained.

*Example 10*

The method described in Example 8 is repeated, using an aluminum foil instead of paper as a support. Images of the master, which are rich in contrast are obtained. The coated aluminum foil may be positively charged in the same manner as described in Example 9 and powdered with the developer described therein.

*Example 11*

The benzene solution produced as described in Example 8 is coated and dried on a transparent paper. By the electrophotographic procedure, images are produced on this coated transparent paper. They can be used as intermediate originals for further copying, e.g. for copying on blue print paper.

*Example 12*

A coating solution produced as described in Example 8 is coated into a superficially saponified cellulose acetate film. Further procedure is as described in Example 8. The time of exposure under a master, using a 125 watt high pressure mercury lamp at a distance of 30 cm., is 5 seconds.

*Example 13*

In 10 parts by volume of benzene there are dissolved (a) 0.25 part by weight of a high molecular weight reaction product obtained by the alkylation of 71.4 parts by weight of anthracene with 127 parts by weight of 1,4-dichloro-butane in the presence of 107 parts by weight of aluminum chloride and (b) 0.25 part by weight of a high molecular reaction product obtained by the alkylation of 30.4 parts by weight of diphenyl with 35 parts by weight of p-xylene-dichloride in the presence of 54 parts by weight of aluminum chloride. This solution is coated onto an aluminum foil and then dried. Electrophotographic images are produced by the method described in Example 8.

*Example 14*

10 parts by weight of after-chlorinated polyvinyl chloride (e.g. "Rhenoflex") are dissolved in a mixture consisting of 100 parts by volume of methylethylketone and 50 parts by volume of toluene. Into this solution, there are introduced 10 parts by weight of the high molecular weight compound obtained by alkylation, according to the method of Friedel-Crafts, of 98 parts by weight of 9-ethylcarbazole with 135 parts by weight of 1,2-dichloroethane in the presence of 61 parts by weight of aluminum chloride. The resulting suspension is very finely ground in a colloid mill. A paper which had been pretreated against the penetration of organic solvents is mechanically coated with this suspension and then dried. With the thus coated paper, electrophotographic images are produced by the method described in Example 8.

*Example 15*

0.5 part by weight of the high molecular weight alkylation product of 9-methyl-carbazol and p-xylylene dichloride described in Example 1 above, are dissolved in 10 parts by volume of benzene. A solution of 0.005 part by weight of Rhodamine B extra (Schultz', "Farbstofftabellen," 7th edition, vol. 1, No. 864) in 0.3 part by volume of methanol is added. The solution is coated onto an aluminum foil. After evaporating the solvent, a firmly adhering layer is obtained. The coated foil is provided, in conventional manner, with a negative electrostatic charge and exposed to light under a master, using a 100-watt incandescent bulb. The exposed surface is powdered in known manner, so that an electrostatic image corresponding to the master becomes visible. It is fixed by brief heating or by treatment with vapors of trichloroethylene. An increase in the light sensitivity of the electrophotographic layer is obtained by adding 0.006 part by weight of 2,3,6,7-tetra-nitrofluorenone.

*Example 16*

The method described in Example 8 is repeated, using, instead of the high molecular weight photoelectric semiconductor mentioned therein, a high molecular weight alkylation product, obtained by reacting 9.2 parts by weight of terphenyl and 31 parts by weight of 1,4-dichloro-butane in the presence of 16 parts by weight of aluminum chloride. The layer may be charged positively as well as negatively and thus used for the production of electrophotographic images.

*Example 17*

0.5 part by weight of the alkylation product of 9-methyl-carbazole and p-xylylene dichloride (described in Example 1 above) are dissolved, together with 0.006 part by weight of 1,2-benzanthraquinone-(9,10) in 10 parts by volume of benzene. An aluminum foil is coated with this solution and, after drying, an electrophotographic image is produced as described in Example 8. The time of exposure is reduced to 1/5 of that required for a layer containing no 1,2-benzanthraquinone-(9,10). Instead of 1,2-benzanthraquinone-(9,10) the same quantity by weight of 2,3,6,7-tetranitrofluorenone can be used, with equally good success.

*Example 18*

0.5 part by weight of the high molecular weight product of the reaction of 30.4 parts by weight of diphenyl with 35 parts by weight of p-xylylene-dichloride (in the presence of 54 parts by weight of aluminum chloride) is dissolved in 10 parts by volume of benzene and 0.006 part by volume of 1,2-benzanthraquinone-(9,10) is added to this solution. An aluminum foil is coated with this solution and an electrophotographic image is produced in known manner. The time of exposure is reduced to 1/5 of that required for a layer containing no 1,2-benzanthraquinone-(9,10).

*Example 19*

The method described in Example 18 is repeated, but as the high molecular weight compound, there is used the self-condensation product resulting from 100 parts by weight of benzylchloride in the presence of 0.5 part by weight of iron trichloride.

*Example 20*

A solution is prepared which contains, dissolved in 10 parts by weight of toluene, 0.5 part of weight of a high molecular weight self-condensation product of benzylbromide, which was obtained by heating 200 parts by weight of benzylbromide with 0.2 part by weight of iron-trichloride. After adding 0.006 part by weight of 2,3,6,7-tetranitrofluorenone, an aluminum foil is coated with this solution in a manner known per se. After evaporation

What is claimed is:

1. An electrophotographic material comprising a conductive support layer and a photoconductive insulating layer, the latter comprising a member of the group consisting of an optical sensitizer and an activator in admixture with a compound selected from the group consisting of resinous reaction products of an aralkyl halide with itself; and an aromatic compound having at least one reactive hydrogen atom with a hydrocarbon containing at least two halogen atoms, in the presence of a Friedel-Crafts catalyst.

2. A material according to claim 1 in which the compound is the reaction product of an aralkyl halide with itself.

3. A material according to claim 1 in which the compound is the reaction product of an aromatic compound having at least one reactive hydrogen atom and a hydrocarbon containing at least two halogen atoms.

4. A material according to claim 1 in which the compound is the reaction product of 9-methyl-carbazole and p-xylylene-dichloride.

5. A material according to claim 1 in which the compound is the reaction product of diphenyl and methylene chloride.

6. A material according to claim 1 in which the compound is the reaction product of acenaphthene and 1,4-dichlorobutane.

7. A material according to claim 1 in which the compound is the reaction product of dibenzofurane and 1,4-dichlorobutane.

8. A material according to claim 1 in which the compound is the reaction product of diphenyl and 1,2,3-tribromopropane.

9. A material according to claim 1 in which the compound is the reaction product of diphenyl and chlorinated polyethylene.

10. A material according to claim 1 in which the compound is the reaction product of 1-chloromethyl-naphthalene with itself.

11. A material according to claim 1 in which the compound is the reactive product of anthracene and 1,4-dichlorobutane.

12. A material according to claim 1 in which the compound is the reaction product of diphenyl and p-xylylene-dichloride.

13. A material according to claim 1 in which the compound is the reaction product of 9-ethylcarbazole and 1,2-dichloroethane.

14. A material according to claim 1 in which the compound is the reaction product of terphenyl and 1,4-dichlorobutane.

15. A material according to claim 1 in which the compound is the reaction product of benzylchloride with itself.

16. A photographic reproduction process which comprises exposing an electrostatically charged supported photoconductive insulating layer to light under a master and developing the resulting image with an electroscopic material, the photoconductive layer comprising a compound selected from the group consisting of resinous reaction products of an aralkyl halide with itself; and an aromatic compound having at least one reactive hydrogen atom with a hydrocarbon containing at least two halogen atoms, in the presence of a Friedel-Crafts catalyst.

17. A process according to claim 16 in which the compound is the reaction product of an aralkyl halide with itself.

18. A process according to claim 16 in which the compound is the reaction product of an aromatic compound having at least one reactive hydrogen atom and a hydrocarbon containing at least two halogen atoms.

19. A process according to claim 16 in which the compound is the reaction product of 9-methyl-carbazole and p-xylylene-dichloride.

20. A process according to claim 16 in which the compound is the reaction product of diphenyl and methylene chloride.

21. A process according to claim 16 in which the compound is the reaction product of acenaphthene and 1,4-dichlorobutane.

22. A process according to claim 16 in which the compound is the reaction product of dibenzofurane and 1,4-dichlorobutane.

23. A process according to claim 16 in which the compound is the reaction product of diphenyl and 1,2,3-tribromopropane.

24. A process according to claim 16 in which the compound is the reaction product of diphenyl and chlorinated polyethylene.

25. A process according to claim 16 in which the compound is the reaction product of 1-chloromethyl-naphthalene with itself.

26. A process according to claim 16 in which the compound is the reaction product of anthracene and 1,4-dichlorobutane.

27. A process according to claim 16 in which the compound is the reaction product of diphenyl and p-xylylene-dichloride.

28. A process according to claim 16 in hich the compound is the reaction product of 9-ethylcarbazole and 1,2-dichloroethane.

29. A process according to claim 16 in which the compound is the reaction product of terphenyl and 1,4-dichlorobutane.

30. A process according to claim 16 in which the compound is the reaction product of benzylchloride with itself.

31. A process according to claim 16 in which the photoconductive layer also contains a member of the group consisting of an optical sensitizer and an activator.

32. An electrophotographic copying process which comprises exposing an electrostatically charged photoconductive insulating layer comprising a polymeric substance obtained by reacting (A) a halogen containing polymeric substance with (B) an aromatic compound having at least one reactive hydrogen atom in the presence of a Friedel-Crafts catalyst to a light image whereby the light struck area is discharged and developing the resulting image of electrostatic charges with an electroscopic material.

References Cited by the Examiner

UNITED STATES PATENTS

| 2,084,927 | 6/1937 | Towne | 260—671 |
| 2,232,429 | 2/1941 | Bennett | 260—671 |
| 2,297,691 | 10/1942 | Carlson | 96—1 |
| 2,377,433 | 6/1945 | Lieber | 260—671 |
| 2,663,636 | 12/1953 | Middleton | 96—1 |
| 2,789,052 | 4/1957 | Elliot | 96—115 |

FOREIGN PATENTS

| 201,416 | 4/1956 | Australia. |
| 562,336 | 5/1958 | Belgium. |
| 407,948 | 3/1934 | Great Britain. |

OTHER REFERENCES

Migrdichian: "Organic Synthesis," vol. 1, Reinhold Publ. Co., New York (1957), pages 623–625, 626–638.

NORMAN G. TORCHIN, *Primary Examiner.*

PHILIP E. MANGAN, ABRAHAM H. WINKELSTEIN, *Examiners.*

J. E. ALIX, C. E. VAN HORN, *Assistant Examiners.*